United States Patent
Hsu

(10) Patent No.: US 10,955,889 B1
(45) Date of Patent: Mar. 23, 2021

(54) UNIVERSAL SERIAL BUS POWER-SUPPLYING APPARATUS WITH POWER-SWITCHING FUNCTIONS

(71) Applicant: Powergene Technology Co., Ltd., Taiwan Branch, New Taipei (TW)

(72) Inventor: Hui-Te Hsu, New Taipei (TW)

(73) Assignee: POWERGENE TECHNOLOGY CO., LTD., TAIWAN BRANCH, New Taipei (TW)

( * ) Notice: Subject to any disclaimer, the term of this patent is extended or adjusted under 35 U.S.C. 154(b) by 0 days.

(21) Appl. No.: 16/733,994

(22) Filed: Jan. 3, 2020

(51) Int. Cl.
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
CPC ... G06F 1/26; G06F 1/28; G06F 1/263; G06F 1/305; G06F 1/3296; G06F 1/266
USPC ................................. 713/300, 340
See application file for complete search history.

(56) References Cited

U.S. PATENT DOCUMENTS

| | | | | |
|---|---|---|---|---|
| 8,745,301 | B2 * | 6/2014 | Hawawini | G06F 1/266 |
| | | | | 710/310 |
| 10,521,386 | B2 * | 12/2019 | Kadgi | G06F 11/3051 |
| 2017/0085098 | A1 * | 3/2017 | Sporck | H02J 7/007192 |
| 2017/0235359 | A1 * | 8/2017 | de Nie | G06F 13/385 |
| | | | | 713/310 |
| 2018/0367319 | A1 * | 12/2018 | Hamdi | G06F 1/266 |
| 2019/0036351 | A1 * | 1/2019 | Tian | H02J 7/0045 |
| 2019/0073012 | A1 * | 3/2019 | Sultenfuss | H02J 7/007 |
| 2019/0190246 | A1 * | 6/2019 | Foster | H02H 7/26 |

* cited by examiner

*Primary Examiner* — Faisal M Zaman
(74) *Attorney, Agent, or Firm* — Muncy, Geissler, Olds & Lowe, P.C.

(57) ABSTRACT

A universal serial bus power-supplying apparatus with power-switching functions includes a power convertor, a power delivery communication controller and a plurality of switch units. The power delivery communication controller calculates a first communication time between the universal serial bus power-supplying apparatus and a first electronic apparatus. The power delivery communication controller calculates a second communication time between the universal serial bus power-supplying apparatus and a second electronic apparatus. The universal serial bus power-supplying apparatus utilizes a time difference between the first communication time and the second communication time to switch the switch units to supply power to the first electronic apparatus and the second electronic apparatus.

10 Claims, 3 Drawing Sheets

UNIVERSAL SERIAL BUS POWER-SUPPLYING APPARATUS WITH POWER-SWITCHING FUNCTIONS

BACKGROUND OF THE INVENTION

Field of the Invention

The present invention relates to a universal serial bus power-supplying apparatus, and especially relates to a universal serial bus power-supplying apparatus with power-switching functions.

Description of the Related Art

The type-C USB PD (power delivery) has to support multiple outputs to supply power to multiple electronic apparatuses. When more than two electronic apparatuses are connected to the type-C USB PD, the fast charging voltage requested by every electronic apparatus may be different (may be 9, 12, 15 or 20 volts), and the communication time between the type-C USB PD and every electronic apparatus may be also different, wherein the communication contents are: what kinds of voltages the type-C USB PD can supply, and the requirement voltage of the electronic apparatus and so on. Therefore, a related art type-C USB PD will comprise a lot of power convertors to respectively correspond to different power output ports and different electronic apparatuses. However, because the related art type-C USB PD comprises a lot of power convertors, the cost of the related art type-C USB PD is very high.

Another related art type-C USB PD comprises only one power convertor. Because the communication time between the type-C USB PD and every electronic apparatus may be different, this kind of related art type-C USB PD which comprises only one power convertor uniformly outputs only 5 volts when being connected to more than two electronic apparatuses, to avoid damaging the electronic apparatus which may exist and requests only 5 volts. For example, one electronic apparatus requests 9 volts while another electronic apparatus requests only 5 volts; if the type-C USB PD outputs 9 volts, the electronic apparatus which requests only 5 volts will be damaged. In other words, for this kind of related art type-C USB PD which comprises only one power convertor, even if more than two electronic apparatuses which are connected to the related art type-C USB PD request the same voltage which is not 5 volts (for example, request 9 volts), this kind of related art type-C USB PD uniformly outputs only 5 volts, which is a pity.

SUMMARY OF THE INVENTION

In order to solve the above-mentioned problems, an object of the present invention is to provide a universal serial bus power-supplying apparatus with power-switching functions.

In order to achieve the object of the present invention mentioned above, the universal serial bus power-supplying apparatus of the present invention is applied to a first electronic apparatus and a second electronic apparatus. The universal serial bus power-supplying apparatus comprises a power convertor, a power delivery communication controller, a first switch unit and a second switch unit. The power delivery communication controller is electrically connected to the power convertor. The first switch unit is electrically connected to the power convertor, the power delivery communication controller and the first electronic apparatus. The second switch unit is electrically connected to the power convertor, the power delivery communication controller and the second electronic apparatus. Moreover, the power delivery communication controller is configured to calculate a first communication time between the universal serial bus power-supplying apparatus and the first electronic apparatus. The power delivery communication controller is configured to calculate a second communication time between the universal serial bus power-supplying apparatus and the second electronic apparatus. The universal serial bus power-supplying apparatus is configured to utilize a time difference between the first communication time and the second communication time to control the first switch unit or the second switch unit to supply power to the first electronic apparatus and the second electronic apparatus to drive the first electronic apparatus and the second electronic apparatus.

The advantage of the present invention is that the universal serial bus power-supplying apparatus can supply the voltage more than 5 volts to more than two electronic apparatuses but only one power convertor is requested and utilized.

DETAILED DESCRIPTION OF THE INVENTION

Figure 1:
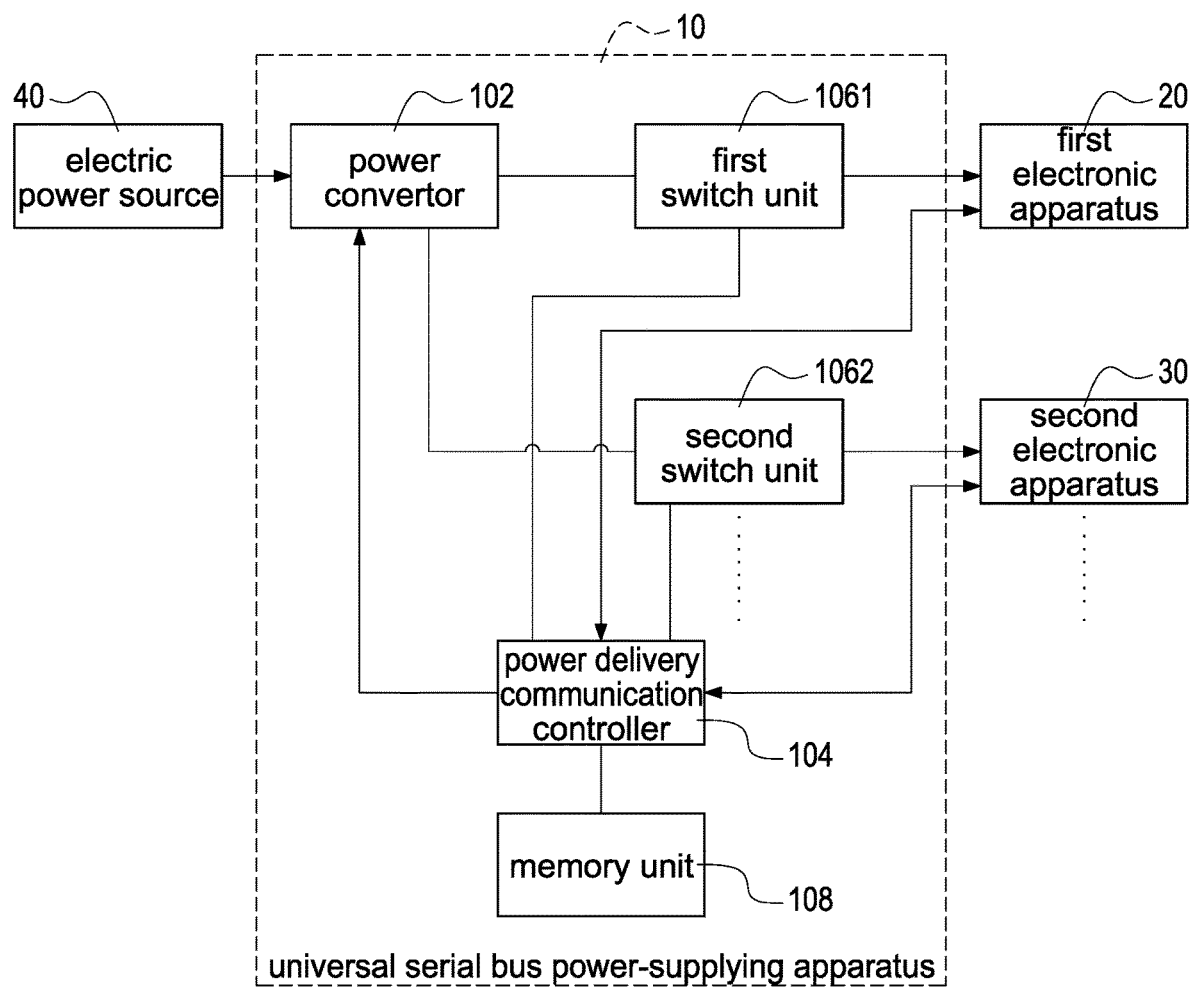
FIG. 1 shows a block diagram of the universal serial bus power-supplying apparatus of the present invention.

FIG. 1 shows a block diagram of the universal serial bus power-supplying apparatus of the present invention. A universal serial bus power-supplying apparatus 10 (for example, a type-C USB PD) with power-switching functions is applied to a first electronic apparatus 20, a second electronic apparatus 30 and an electric power source 40 (for examples, an alternating current power, a direct current power or a battery, to supply power to the power convertor 102 mentioned below). The universal serial bus power-supplying apparatus 10 comprises a power convertor 102, a power delivery communication controller 104, a first switch unit 1061, a second switch unit 1062 and a memory unit 108. The components mentioned above are electrically connected to each other.

It is noted that FIG. 1 comprises only two electronic apparatuses (the first electronic apparatus 20 and the second electronic apparatus 30) but the practical application is not limited by it; more than three electronic apparatuses can be comprised. FIG. 1 comprises only two switch units (the first switch unit 1061 and the second switch unit 1062) but the practical application is not limited by it; more than three switch units can be comprised. The power delivery communication controller 104 can control the power convertor 102 to convert and output 5, 9, 12, 15 or 20 volts direct current voltage, and can control the first switch unit 1061 and the second switch unit 1062 to be turned on or to be turned off, to determine whether the voltage generated by the power convertor 102 can be outputted to the corresponding electronic apparatus or not; the power delivery communication controller 104 can further control (switch) the first switch unit 1061 and the second switch unit 1062 to determine the voltages outputted to the first electronic apparatus 20 and the second electronic apparatus 30. For example, although the power convertor 102 sends 9 volts direct current voltage to the second switch unit 1062, the power delivery communication controller 104 can switch the second switch unit 1062, so that the second switch unit 1062 is configured to output 5 volts direct current voltage to the second electronic apparatus 30.

The main concepts of the present invention are that the power delivery communication controller 104 is configured to calculate a first communication time between the universal serial bus power-supplying apparatus 10 and the first electronic apparatus 20; the power delivery communication controller 104 is configured to calculate a second communication time between the universal serial bus power-supplying apparatus 10 and the second electronic apparatus 30; the universal serial bus power-supplying apparatus 10 is configured to utilize a time difference between the first communication time and the second communication time to control (switch) the first switch unit 1061 or the second switch unit 1062 (to complete a communication with the first electronic apparatus 20 or the second electronic apparatus 30) to supply power to the first electronic apparatus 20 and the second electronic apparatus 30 to drive the first electronic apparatus 20 and the second electronic apparatus 30. Moreover, the memory unit 108 is configured to store the first communication time, the second communication time and the time difference; the time difference is greater than 0 second.

The first communication time is defined as: from the universal serial bus power-supplying apparatus 10 sends out a first initial communication signal, until the universal serial bus power-supplying apparatus 10 receives a first requirement signal. Moreover, the first initial communication signal sent by the universal serial bus power-supplying apparatus 10 is sent to the first electronic apparatus 20; the first requirement signal received by the universal serial bus power-supplying apparatus 10 is sent by the first electronic apparatus 20; the first requirement signal is used to indicate a magnitude of a requirement voltage of the first electronic apparatus 20.

The second communication time is defined as: from the universal serial bus power-supplying apparatus 10 sends out a second initial communication signal, until the universal serial bus power-supplying apparatus 10 receives a second requirement signal. Moreover, the second initial communication signal sent by the universal serial bus power-supplying apparatus 10 is sent to the second electronic apparatus 30; the second requirement signal received by the universal serial bus power-supplying apparatus 10 is sent by the second electronic apparatus 30; the second requirement signal is used to indicate a magnitude of a requirement voltage of the second electronic apparatus 30.

Generally speaking, an initial condition of the present invention is that: Firstly, the first electronic apparatus 20 has been connected to the universal serial bus power-supplying apparatus 10, and the universal serial bus power-supplying apparatus 10 has supplied power to the first electronic apparatus 20 to drive the first electronic apparatus 20; this means that the universal serial bus power-supplying apparatus 10 has completed a communication with the first electronic apparatus 20 and has been aware of the first requirement signal and the first communication time. Then, if the second electronic apparatus 30 intends to connect to the universal serial bus power-supplying apparatus 10 and after the second electronic apparatus 30 is connected to the universal serial bus power-supplying apparatus 10, the universal serial bus power-supplying apparatus 10 stops supplying power to the first electronic apparatus 20, and the universal serial bus power-supplying apparatus 10 communicates with the second electronic apparatus 30, so that the power delivery communication controller 104 is configured to calculate the second communication time between the universal serial bus power-supplying apparatus 10 and the second electronic apparatus 30 and is configured to be aware of the second requirement signal and the second communication time. Later, the universal serial bus power-supplying apparatus 10 also stops communicating with the second electronic apparatus 30. Later, the present invention will firstly determine whether the magnitude of the requirement voltage of the first electronic apparatus 20 indicated by the first requirement signal is equal to the magnitude of the requirement voltage of the second electronic apparatus 30 indicated by the second requirement signal or not. If they are different, because the present invention has only one power convertor 102, after the universal serial bus power-supplying apparatus 10 re-powers on the first electronic apparatus 20 and the second electronic apparatus 30 and completes the communications again (because as mentioned above, the universal serial bus power-supplying apparatus 10 has stopped supplying power to the first electronic apparatus 20, and the universal serial bus power-supplying apparatus 10 also has stopped communicating with the second electronic apparatus 30, the universal serial bus power-supplying apparatus 10 will communicate with the first electronic apparatus 20 and the second electronic apparatus 30 again after re-powering on), the power convertor 102 will output only 5 volts voltage. But if they are the same, the present invention comprises following two conditions, which are described in details as following:

1. If the second communication time is greater than the first communication time: the second communication time minus the first communication time obtains the time difference by the power delivery communication controller 104. The universal serial bus power-supplying apparatus 10 sends the first initial communication signal to the first electronic apparatus 20, and the universal serial bus power-supplying apparatus 10 sends the second initial communication signal to the second electronic apparatus 30 at the same time. After the first communication time, the first electronic apparatus 20 completes the communication with the universal serial bus power-supplying apparatus 10, so that the universal serial bus power-supplying apparatus 10 outputs the requirement voltage of the first electronic apparatus 20 indicated by the first requirement signal (which is equal to the requirement voltage of the second electronic apparatus 30 indicated by the second requirement signal, for example, 9 volts voltage) to the first electronic apparatus 20 (namely, the power delivery communication controller 104 controls the power convertor 102 to convert and output 9 volts voltage mentioned above to the first switch unit 1061 and the second switch unit 1062; namely, at this time the power delivery communication controller 104 completely turns on the first switch unit 1061 so that the 9 volts voltage generated by the power convertor 102 mentioned above is sent to the first electronic apparatus 20), but the power delivery communication controller 104 switches the second switch unit 1062 which receives the 9 volts voltage mentioned above to convert/switch the 9 volts voltage mentioned above to output 5 volts voltage to the second electronic apparatus 30 the time difference (to maintain the communication with the second electronic apparatus 30, because 5 volts voltage is required during the communication period). After the time difference (meaning that the second electronic apparatus 30 also completes the communication with the universal serial bus power-supplying apparatus 10), the universal serial bus power-supplying apparatus 10 outputs the requirement voltage of the second electronic apparatus 30 indicated by the second requirement signal (which is equal to the requirement voltage of the first electronic apparatus 20 indicated by the first requirement signal, for example, 9 volts voltage) to the second electronic apparatus 30 (namely, at this time the power delivery communication controller 104 completely turns on the second switch unit 1062 so that the 9 volts voltage generated by the power convertor 102 mentioned above is sent to the second electronic apparatus 30).

2. If the second communication time is not greater than the first communication time: the first communication time minus the second communication time obtains the time difference by the power delivery communication controller 104. The universal serial bus power-supplying apparatus 10 sends the first initial communication signal to the first electronic apparatus 20, and the universal serial bus power-supplying apparatus 10 sends the second initial communication signal to the second electronic apparatus 30 at the same time. After the second communication time, the second electronic apparatus 30 completes the communication with the universal serial bus power-supplying apparatus 10, so that the universal serial bus power-supplying apparatus 10 outputs the requirement voltage of the second electronic apparatus 30 indicated by the second requirement signal (which is equal to the requirement voltage of the first electronic apparatus 20 indicated by the first requirement signal, for example, 9 volts voltage) to the second electronic apparatus 30 (namely, the power delivery communication controller 104 controls the power convertor 102 to convert and output 9 volts voltage mentioned above to the first switch unit 1061 and the second switch unit 1062; namely, at this time the power delivery communication controller 104 completely turns on the second switch unit 1062 so that the 9 volts voltage generated by the power convertor 102 mentioned above is sent to the second electronic apparatus 30), but the power delivery communication controller 104 switches the first switch unit 1061 which receives the 9 volts voltage mentioned above to convert/switch the 9 volts voltage mentioned above to output 5 volts voltage to the first electronic apparatus 20 the time difference (to maintain the communication with the first electronic apparatus 20, because 5 volts voltage is required during the communication period). After the time difference (meaning that the first electronic apparatus 20 also completes the communication with the universal serial bus power-supplying apparatus 10), the universal serial bus power-supplying apparatus 10 outputs the requirement voltage of the first electronic apparatus 20 indicated by the first requirement signal (which is equal to the requirement voltage of the second electronic apparatus 30 indicated by the second requirement signal, for example, 9 volts voltage) to the first electronic apparatus 20 (namely, at this time the power delivery communication controller 104 completely turns on the first switch unit 1061 so that the 9 volts voltage generated by the power convertor 102 mentioned above is sent to the first electronic apparatus 20).

In other words, if the magnitude of the requirement voltage of the first electronic apparatus 20 indicated by the first requirement signal is equal to the magnitude of the requirement voltage of the second electronic apparatus 30 indicated by the second requirement signal (for example, the magnitude of the requirement voltage of the first electronic apparatus 20 indicated by the first requirement signal is, for example, 9 volts, which is greater than 5 voles, and which is equal to the magnitude of the requirement voltage of the second electronic apparatus 30 indicated by the second requirement signal), the universal serial bus power-supplying apparatus 10 utilizes the conditions mentioned above to send a voltage having the magnitude of the requirement voltage of the first electronic apparatus 20 indicated by the first requirement signal to the first electronic apparatus 20 and the second electronic apparatus 30 to drive the first electronic apparatus 20 and the second electronic apparatus 30.

Figure 2:
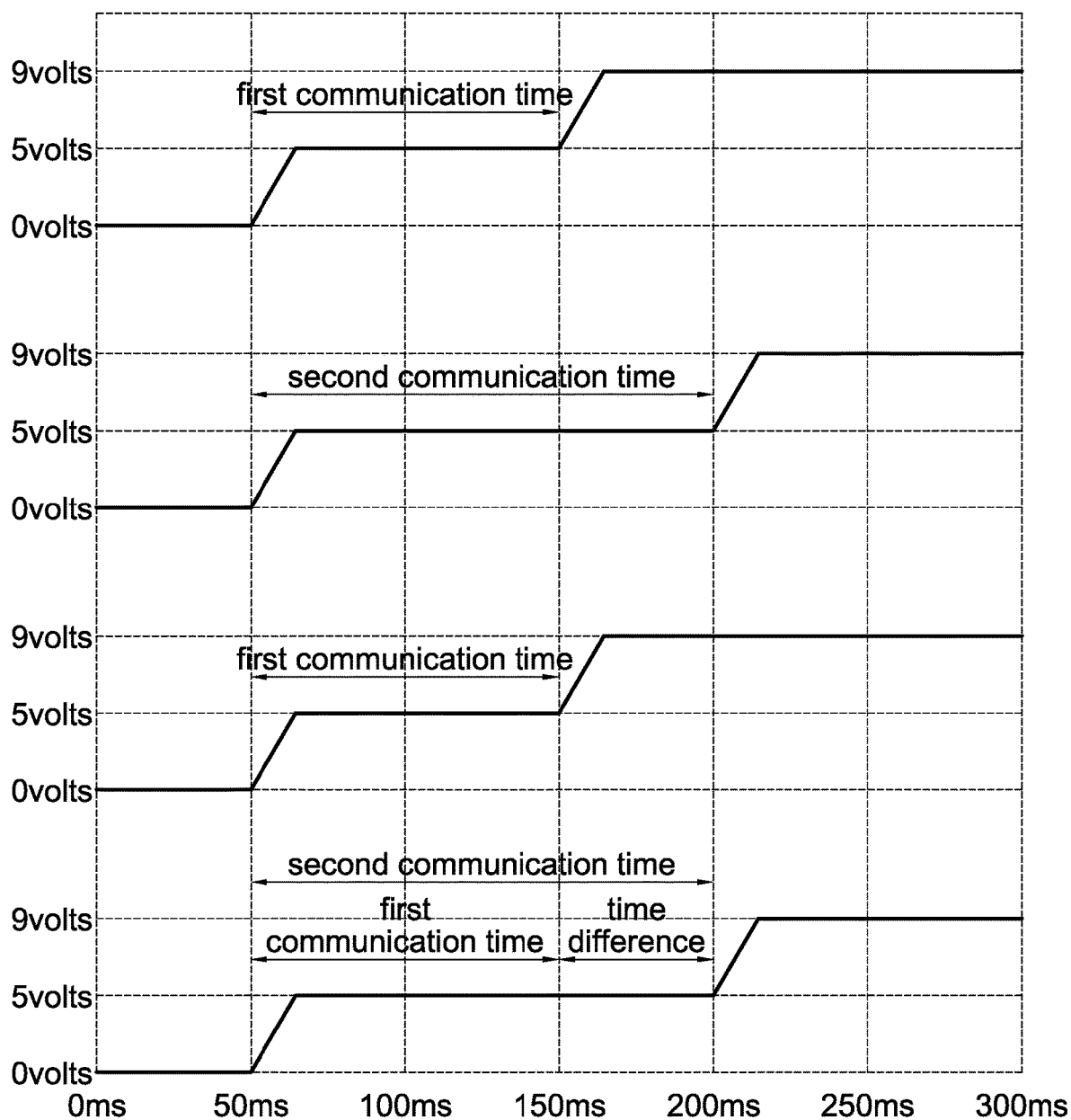
FIG. 2 shows a timing diagram of an embodiment of the universal serial bus power-supplying apparatus of the present invention.

FIG. 2 shows a timing diagram of an embodiment of the universal serial bus power-supplying apparatus of the present invention. Please refer to FIG. 1 at the same time.

FIG. 2 takes the second communication time greater than the first communication time as an example. In FIG. 2, from top to bottom the first waveform indicates that the first electronic apparatus 20 is solely connected to the universal serial bus power-supplying apparatus. As shown in FIG. 2, the first communication time of the first electronic apparatus 20 and the universal serial bus power-supplying apparatus is 100 ms (150 ms-50 ms=100 ms). The requirement voltage of the first electronic apparatus 20 is 9 volts. From top to bottom the second waveform indicates that the second electronic apparatus 30 is solely connected to the universal serial bus power-supplying apparatus. As shown in FIG. 2, the second communication time of the second electronic apparatus 30 and the universal serial bus power-supplying apparatus is 150 ms (200 ms-50 ms=150 ms). The requirement voltage of the second electronic apparatus 30 is 9 volts. From top to bottom the third waveform indicates after re-powering on, the timing sequence of the first electronic apparatus 20 and the universal serial bus power-supplying apparatus. From top to bottom the fourth waveform indicates after re-powering on, the timing sequence of the second electronic apparatus 30 and the universal serial bus power-supplying apparatus. After the first communication time, the power delivery communication controller 104 switches the second switch unit 1062 to output 5 volts voltage to the second electronic apparatus 30 the time difference (maintaining 50 ms to maintain the communication with the second electronic apparatus 30). Therefore, the universal serial bus power-supplying apparatus 10 can supply the same voltage (for example, 9 volts) to the two electronic apparatuses.

Figure 3:
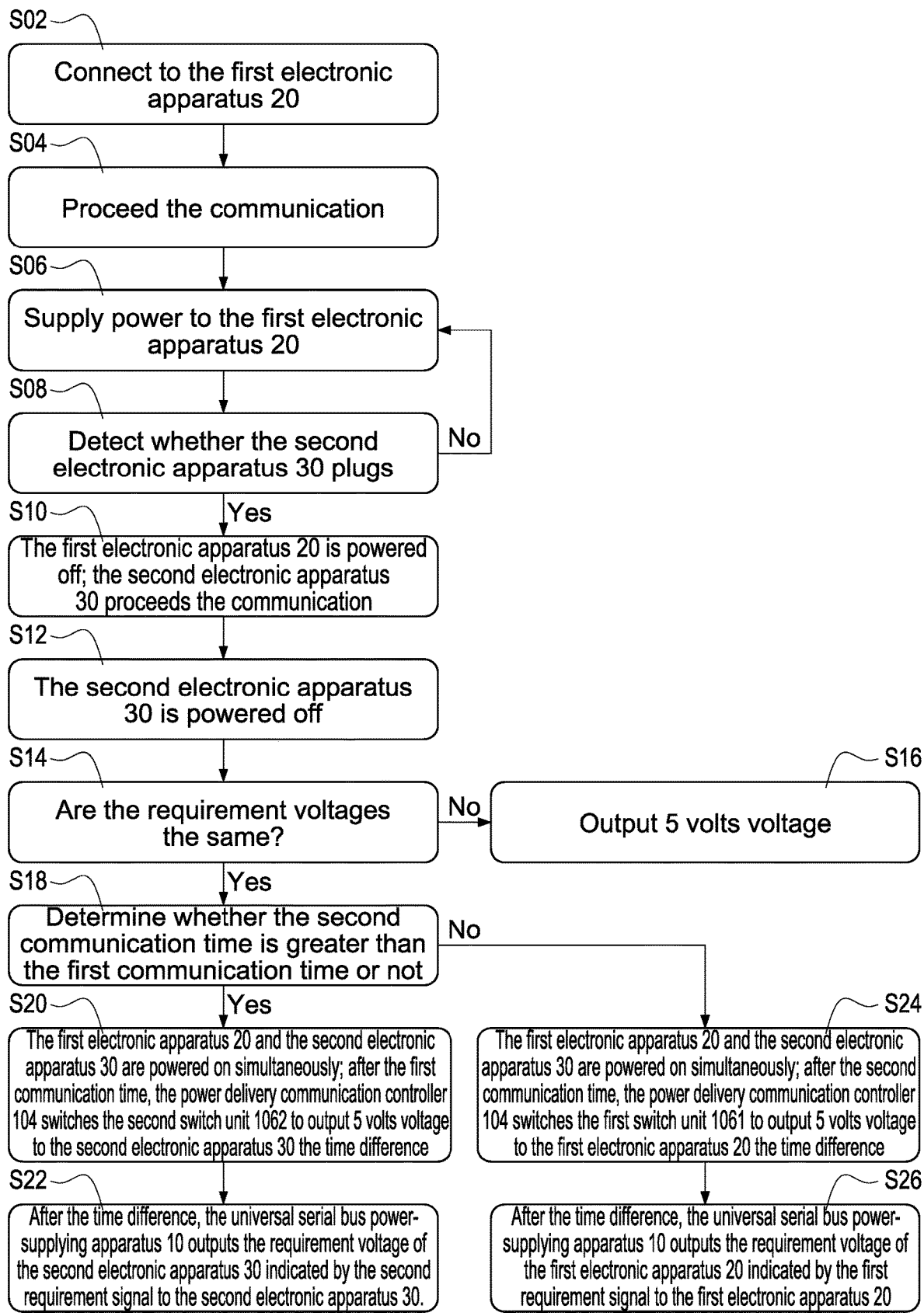
FIG. 3 shows a flow chart of the method applied to the universal serial bus power-supplying apparatus of the present invention.

FIG. 3 shows a flow chart of the method applied to the universal serial bus power-supplying apparatus of the present invention; it is also called "a power-supplying method for the universal serial bus power-supplying apparatus with power-switching functions". Please refer to FIG. 1 at the same time. The power-supplying method comprises following steps:

Step S02: Connect to the first electronic apparatus 20. Namely, the first electronic apparatus 20 is connected to the universal serial bus power-supplying apparatus 10. Then, the power-supplying method goes to Step S04.

Step S04: Proceed the communication. Namely, the universal serial bus power-supplying apparatus 10 (sending out 5 volts) proceeds the communication with the first electronic apparatus 20, so that the universal serial bus power-supplying apparatus 10 is aware of the first requirement signal and the first communication time. Then, the power-supplying method goes to Step S06.

Step S06: Supply power to the first electronic apparatus 20. Namely, in accordance with the magnitude of the requirement voltage of the first electronic apparatus 20 indicated by the first requirement signal, the universal serial bus power-supplying apparatus 10 supplies power to the first electronic apparatus 20 to drive the first electronic apparatus 20. Then, the power-supplying method goes to Step S08.

Step S08: Detect whether the second electronic apparatus 30 plugs. Namely, the universal serial bus power-supplying apparatus 10 detects whether the second electronic apparatus 30 plugs into the universal serial bus power-supplying apparatus 10 or not. If no (namely, the second electronic apparatus 30 does not plug into the universal serial bus power-supplying apparatus 10), the power-supplying method goes back to Step S06. If yes (namely, the second electronic apparatus 30 plugs into the universal serial bus power-supplying apparatus 10), the power-supplying method goes to Step S10.

Step S10: The first electronic apparatus 20 is powered off; the second electronic apparatus 30 proceeds the communication. Namely, the universal serial bus power-supplying apparatus 10 stops supplying power to the first electronic apparatus 20, wherein originally the power supplied to the first electronic apparatus 20 is in accordance with the magnitude of the requirement voltage of the first electronic apparatus 20 indicated by the first requirement signal. The universal serial bus power-supplying apparatus 10 (sending out 5 volts) proceeds the communication with the second electronic apparatus 30, so that the universal serial bus power-supplying apparatus 10 is aware of the second requirement signal and the second communication time. Then, the power-supplying method goes to Step S12.

Step S12: The second electronic apparatus 30 is powered off. Namely, the universal serial bus power-supplying apparatus 10 stops communicating with the second electronic apparatus 30. Then, the power-supplying method goes to Step S14.

Step S14: Are the requirement voltages the same? Namely, the universal serial bus power-supplying apparatus 10 is configured to determine whether the magnitude of the requirement voltage of the first electronic apparatus 20 indicated by the first requirement signal is equal to the magnitude of the requirement voltage of the second electronic apparatus 30 indicated by the second requirement signal or not. If they are different, the power-supplying method goes to Step S16. If they are the same, the power-supplying method goes to Step S18.

Step S16: Output 5 volts voltage. Namely, the universal serial bus power-supplying apparatus 10 will communicate with the first electronic apparatus 20 and the second electronic apparatus 30 again after re-powering on, and after the communications have been completed, the universal serial bus power-supplying apparatus 10 will output only 5 volts voltage.

Step S18: Determine whether the second communication time is greater than the first communication time or not. If yes, the power-supplying method goes to Step S20; at this time the present invention also obtains the time difference from the second communication time minus the first communication time. If no, the power-supplying method goes to Step S24; at this time the present invention also obtains the time difference from the first communication time minus the second communication time.

Step S20: The first electronic apparatus 20 and the second electronic apparatus 30 are powered on simultaneously; after the first communication time, the power delivery communication controller 104 switches the second switch unit 1062 to output 5 volts voltage to the second electronic apparatus 30 the time difference. Namely, the universal serial bus power-supplying apparatus 10 sends the first initial communication signal to the first electronic apparatus 20, and the universal serial bus power-supplying apparatus 10 sends the second initial communication signal to the second electronic apparatus 30 at the same time. After the first communication time, the first electronic apparatus 20 completes the communication with the universal serial bus power-supplying apparatus 10, so that the universal serial bus power-supplying apparatus 10 outputs the requirement voltage of the first electronic apparatus 20 indicated by the first requirement signal (which is equal to the requirement voltage of the second electronic apparatus 30 indicated by the second requirement signal) to the first electronic apparatus 20, but the power delivery communication controller 104 switches the second switch unit 1062 to output 5 volts voltage to the second electronic apparatus 30 the time difference (to maintain the communication with the second electronic apparatus 30). Please refer to FIG. 2 again. Namely, the power delivery communication controller 104 switches the second switch unit 1062 to output 5 volts voltage (maintaining 50 ms) to the second electronic apparatus 30 (to maintain the communication with the second electronic apparatus 30). Then, the power-supplying method goes to Step S22.

Step S22: After the time difference, the universal serial bus power-supplying apparatus 10 outputs the requirement voltage of the second electronic apparatus 30 indicated by the second requirement signal to the second electronic apparatus 30. Namely, after the time difference, the second electronic apparatus 30 also completes the communication with the universal serial bus power-supplying apparatus 10, so that the universal serial bus power-supplying apparatus 10 outputs the requirement voltage of the second electronic apparatus 30 indicated by the second requirement signal (which is equal to the requirement voltage of the first electronic apparatus 20 indicated by the first requirement signal) to the second electronic apparatus 30.

Step S24: The first electronic apparatus 20 and the second electronic apparatus 30 are powered on simultaneously; after the second communication time, the power delivery communication controller 104 switches the first switch unit 1061 to output 5 volts voltage to the first electronic apparatus 20 the time difference. Namely, the universal serial bus power-supplying apparatus 10 sends the first initial communication signal to the first electronic apparatus 20, and the universal serial bus power-supplying apparatus 10 sends the second initial communication signal to the second electronic apparatus 30 at the same time. After the second communication time, the second electronic apparatus 30 completes the communication with the universal serial bus power-supplying apparatus 10, so that the universal serial bus power-supplying apparatus 10 outputs the requirement voltage of the second electronic apparatus 30 indicated by the second requirement signal (which is equal to the requirement voltage of the first electronic apparatus 20 indicated by the first requirement signal) to the second electronic apparatus 30, but the power delivery communication controller 104 switches the first switch unit 1061 to output 5 volts voltage to the first electronic apparatus 20 the time difference (to maintain the communication with the first electronic apparatus 20). Then, the power-supplying method goes to Step S26.

Step S26: After the time difference, the universal serial bus power-supplying apparatus 10 outputs the requirement voltage of the first electronic apparatus 20 indicated by the first requirement signal to the first electronic apparatus 20. Namely, after the time difference, the first electronic apparatus 20 also completes the communication with the universal serial bus power-supplying apparatus 10, so that the universal serial bus power-supplying apparatus 10 outputs the requirement voltage of the first electronic apparatus 20 indicated by the first requirement signal (which is equal to the requirement voltage of the second electronic apparatus 30 indicated by the second requirement signal) to the first electronic apparatus 20.

The advantage of the present invention is that the universal serial bus power-supplying apparatus can supply the voltage more than 5 volts to more than two electronic apparatuses but only one power convertor is requested and utilized. Moreover, in an embodiment of the present invention, "determine whether the magnitude of the requirement voltage of the first electronic apparatus 20 indicated by the first requirement signal is equal to the magnitude of the requirement voltage of the second electronic apparatus 30 indicated by the second requirement signal" mentioned above means that: Determine a maximum same value in the kinds of the requirement voltage of the first electronic apparatus 20 and the kinds of the requirement voltage of the second electronic apparatus 30. "If they are different" mentioned above means that: the maximum same value in the kinds of the requirement voltage of the first electronic apparatus 20 and the kinds of the requirement voltage of the second electronic apparatus 30 is only 5 volts. "If they are the same" mentioned above means that: the maximum same value in the kinds of the requirement voltage of the first electronic apparatus 20 and the kinds of the requirement voltage of the second electronic apparatus 30 is greater than 5 volts (for example, 9 volts). For example, the requirement voltage of the first electronic apparatus 20 comprises only 5 volts; the requirement voltage of the second electronic apparatus 30 comprises 5 volts and 9 volts; the maximum same value in the kinds of the requirement voltage of the first electronic apparatus 20 and the kinds of the requirement voltage of the second electronic apparatus 30 is only 5 volts, so that this condition is referred as "If they are different" mentioned above. For another example, the requirement voltage of the first electronic apparatus 20 comprises 5 volts, 9 volts and 12 volts; the requirement voltage of the second electronic apparatus 30 comprises 5 volts and 9 volts; the maximum same value in the kinds of the requirement voltage of the first electronic apparatus 20 and the kinds of the requirement voltage of the second electronic apparatus 30 is 9 volts (greater than 5 volts), so that this condition is referred as "If they are the same" mentioned above.

What is claimed is:

1. A universal serial bus power-supplying apparatus with power-switching functions, the universal serial bus power-supplying apparatus applied to a first electronic apparatus and a second electronic apparatus, the universal serial bus power-supplying apparatus comprising:
    a power convertor;
    a power delivery communication controller electrically connected to the power convertor;
    a first switch unit electrically connected to the power convertor, the power delivery communication controller and the first electronic apparatus; and
    a second switch unit electrically connected to the power convertor, the power delivery communication controller and the second electronic apparatus,
    wherein the power delivery communication controller is configured to calculate a first communication time between the universal serial bus power-supplying apparatus and the first electronic apparatus; the power delivery communication controller is configured to calculate a second communication time between the universal serial bus power-supplying apparatus and the second electronic apparatus; the universal serial bus power-supplying apparatus is configured to utilize a time difference between the first communication time and the second communication time to control the first switch unit or the second switch unit to supply power to the first electronic apparatus and the second electronic apparatus to drive the first electronic apparatus and the second electronic apparatus.

2. The universal serial bus power-supplying apparatus in claim 1, wherein the first communication time is defined as: from the universal serial bus power-supplying apparatus sends out a first initial communication signal, until the universal serial bus power-supplying apparatus receives a first requirement signal;
    wherein the first initial communication signal sent by the universal serial bus power-supplying apparatus is sent to the first electronic apparatus; the first requirement signal received by the universal serial bus power-supplying apparatus is sent by the first electronic apparatus; the first requirement signal is used to indicate a magnitude of a requirement voltage of the first electronic apparatus.

3. The universal serial bus power-supplying apparatus in claim 2, wherein the second communication time is defined as: from the universal serial bus power-supplying apparatus sends out a second initial communication signal, until the universal serial bus power-supplying apparatus receives a second requirement signal;
    wherein the second initial communication signal sent by the universal serial bus power-supplying apparatus is sent to the second electronic apparatus; the second requirement signal received by the universal serial bus power-supplying apparatus is sent by the second electronic apparatus; the second requirement signal is used to indicate a magnitude of a requirement voltage of the second electronic apparatus.

4. The universal serial bus power-supplying apparatus in claim 3, wherein the magnitude of the requirement voltage of the first electronic apparatus indicated by the first requirement signal is equal to the magnitude of the requirement voltage of the second electronic apparatus indicated by the second requirement signal; the magnitude of the requirement voltage of the first electronic apparatus indicated by the first requirement signal is greater than 5 volts.

5. The universal serial bus power-supplying apparatus in claim 4, wherein when the first electronic apparatus is connected to the universal serial bus power-supplying apparatus and the universal serial bus power-supplying apparatus supplies power to the first electronic apparatus to drive the first electronic apparatus: if the second electronic apparatus intends to connect to the universal serial bus power-supplying apparatus and after the second electronic apparatus is connected to the universal serial bus power-supplying apparatus, the universal serial bus power-supplying apparatus is configured to stop supplying power to the first electronic apparatus, so that the power delivery communication controller is configured to calculate the second communication time between the universal serial bus power-supplying apparatus and the second electronic apparatus, and later the universal serial bus power-supplying apparatus is configured to stop communicating with the second electronic apparatus.

6. The universal serial bus power-supplying apparatus in claim 5, wherein if the second communication time is greater than the first communication time: the second communication time minus the first communication time obtains the time difference by the power delivery communication controller; the universal serial bus power-supplying apparatus is configured to send the first initial communication signal to the first electronic apparatus, and the universal serial bus power-supplying apparatus is configured to simultaneously send the second initial communication signal to the second electronic apparatus; after the first communication time, the power delivery communication controller is configured to switch the second switch unit to output 5 volts voltage to the second electronic apparatus the time difference.

7. The universal serial bus power-supplying apparatus in claim 6, wherein after the first communication time, the universal serial bus power-supplying apparatus is configured to output the requirement voltage of the first electronic apparatus indicated by the first requirement signal to the first electronic apparatus; after the time difference, the universal serial bus power-supplying apparatus is configured to output the requirement voltage of the second electronic apparatus indicated by the second requirement signal to the second electronic apparatus.

8. The universal serial bus power-supplying apparatus in claim 5, wherein if the second communication time is not greater than the first communication time: the first communication time minus the second communication time obtains the time difference by the power delivery communication controller; the universal serial bus power-supplying apparatus is configured to send the first initial communication signal to the first electronic apparatus, and the universal serial bus power-supplying apparatus is configured to simultaneously send the second initial communication signal to the second electronic apparatus; after the second communication time, the power delivery communication controller is configured to switch the first switch unit to output 5 volts voltage to the first electronic apparatus the time difference.

9. The universal serial bus power-supplying apparatus in claim 8, wherein after the second communication time, the universal serial bus power-supplying apparatus is configured to output the requirement voltage of the second electronic apparatus indicated by the second requirement signal to the second electronic apparatus; after the time difference, the universal serial bus power-supplying apparatus is configured to output the requirement voltage of the first electronic apparatus indicated by the first requirement signal to the first electronic apparatus.

10. The universal serial bus power-supplying apparatus in claim 1, further comprising:
a memory unit electrically connected to the power delivery communication controller,
wherein the memory unit is configured to store the first communication time, the second communication time and the time difference; the time difference is greater than 0 second.

\* \* \* \* \*